US012778029B2

United States Patent

Linde et al.

(10) Patent No.: US 12,778,029 B2

(45) Date of Patent: Nov. 3, 2026

(54) KNIFE HOLDER FOR COUNTERKNIFE BANK ASSEMBLY FOR COMBINE HARVESTER

(71) Applicant: CNH Industrial America LLC, New Holland, PA (US)

(72) Inventors: Cooper Linde, Lancaster, PA (US); Nathan E. Isaac, Lancaster, PA (US); Shubham Choudhary, Ghaziabad (IN)

(73) Assignee: CNH Industrial America LLC, New Holland, PA (US)

( * ) Notice: Subject to any disclaimer, the term of this patent is extended or adjusted under 35 U.S.C. 154(b) by 308 days.

(21) Appl. No.: 18/613,215

(22) Filed: Mar. 22, 2024

(65) Prior Publication Data

US 2025/0295076 A1 Sep. 25, 2025

(51) Int. Cl.

*A01F 29/09* (2010.01)
*A01D 43/08* (2006.01)

(52) U.S. Cl.

CPC .......... *A01F 29/095* (2013.01); *A01D 43/088* (2013.01)

(58) Field of Classification Search

CPC ... A01D 41/1243; A01D 43/088; A01F 12/40; A01F 29/095

See application file for complete search history.

(56) References Cited

U.S. PATENT DOCUMENTS

| | | | |
|---|---|---|---|
| 2,700,189 A | 1/1955 | William | |
| 4,077,573 A | 3/1978 | Kersey et al. | |
| 7,484,350 B2 | 2/2009 | Benes et al. | |
| 7,510,472 B1 * | 3/2009 | Farley | A01D 90/04 460/112 |
| 7,677,965 B2 | 3/2010 | Farley et al. | |
| 8,141,805 B1 | 3/2012 | Isaac et al. | |
| 8,920,227 B2 | 12/2014 | Murray et al. | |
| 9,137,949 B2 | 9/2015 | Isaac et al. | |
| 10,225,992 B2 | 3/2019 | Dilts et al. | |
| 2008/0293462 A1 | 11/2008 | Farley et al. | |
| 2014/0150393 A1 | 6/2014 | Stengele | |

(Continued)

FOREIGN PATENT DOCUMENTS

| | | |
|---|---|---|
| EP | 1849348 B1 | 11/2008 |
| EP | 3153012 B1 | 8/2020 |

(Continued)

OTHER PUBLICATIONS

The Extended European Search Report issued Aug. 8, 2025, by the European Patent Office in corresponding European Patent Application No. 25165379.6. (11 pages).

*Primary Examiner* — Giovanna Wright

(74) *Attorney, Agent, or Firm* — Buchanan Ingersoll & Rooney PC

(57) ABSTRACT

A knife holder for a knife bank of an agricultural vehicle. The knife holder includes a body having opposing legs separated by a channel, wherein the channel is sized for receiving a shaft to which the knife holder is mounted; a mount for mounting the body to a knife element; and an opening for receiving a fastener for mounting the body to the shaft such that fastening the body to the shaft causes the legs to deform and compressively contact the shaft and thereby either prevent or limit inadvertent movement of the body relative to the shaft in a direction that is normal to a longitudinal axis of the shaft.

15 Claims, 6 Drawing Sheets

(56) References Cited

U.S. PATENT DOCUMENTS

| | | | | |
|---|---|---|---|---|
| 2014/0179383 | A1 | 6/2014 | Isaac et al. | |
| 2017/0099778 | A1* | 4/2017 | Dilts ...................... | A01D 41/12 |
| 2019/0059219 | A1 | 2/2019 | Linde et al. | |

FOREIGN PATENT DOCUMENTS

| | | | |
|---|---|---|---|
| EP | 4445717 | A1 | 10/2024 |
| EP | 4445718 | A1 | 10/2024 |
| WO | 2014179563 | A1 | 11/2014 |

* cited by examiner

KNIFE HOLDER FOR COUNTERKNIFE BANK ASSEMBLY FOR COMBINE HARVESTER

FIELD OF THE INVENTION

The present invention relates to a combine harvester agricultural machine, and more particularly, to a counter-knife bank assembly of a combine harvester, and even more particularly, to a knife holder for a counterknife bank assembly.

BACKGROUND OF THE INVENTION

As is described in U.S. Pat. No. 9,137,949 (the '949 patent), which is incorporated by reference herein in its entirety, harvesting equipment, such as agricultural combines, can use chopper assemblies, such as integral chopper assemblies or hood mounted chopper assemblies or systems to transport material away from the threshing system and to also treat the material, e.g., by further cutting the material, as it is being transported away from the threshing system.

Integral chopper systems can have a residue chopper assembly that has a rotary chopper component or element disposed laterally within a housing extending generally horizontally across the flow path of the crop residue through the housing, as well as a counter knife assembly extending generally parallel to and spaced from the rotary chopper element. The counter knife assembly can include a chopper grate assembly spaced below and extending generally parallel to the rotary chopper element and a knife mounting assembly positioned generally beneath the chopper grate assembly.

A typical counter knife assembly includes one or more knives mounted to a knife holder, and a plurality of the knife holders may be fixedly mounted to a common shaft. Described herein is an improved and/or different method and system for mounting the knife holders to the common shaft that avoids inadvertent movement of the knife holders relative to the shaft.

SUMMARY OF THE INVENTION

According to one example, a knife holder for a knife bank of an agricultural vehicle is provided. The knife holder includes a body having opposing legs separated by a channel, wherein the channel is sized for receiving a shaft to which the knife holder is mounted; a mount for mounting the body to a knife element; and an opening for receiving a fastener for mounting the body to the shaft such that fastening the body to the shaft causes the legs to deform and compressively contact the shaft and thereby either prevent or limit inadvertent movement of the body relative to the shaft in a direction that is normal to a longitudinal axis of the shaft.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the combine harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow direction and are equally not to be construed as limiting.

Figure 1:
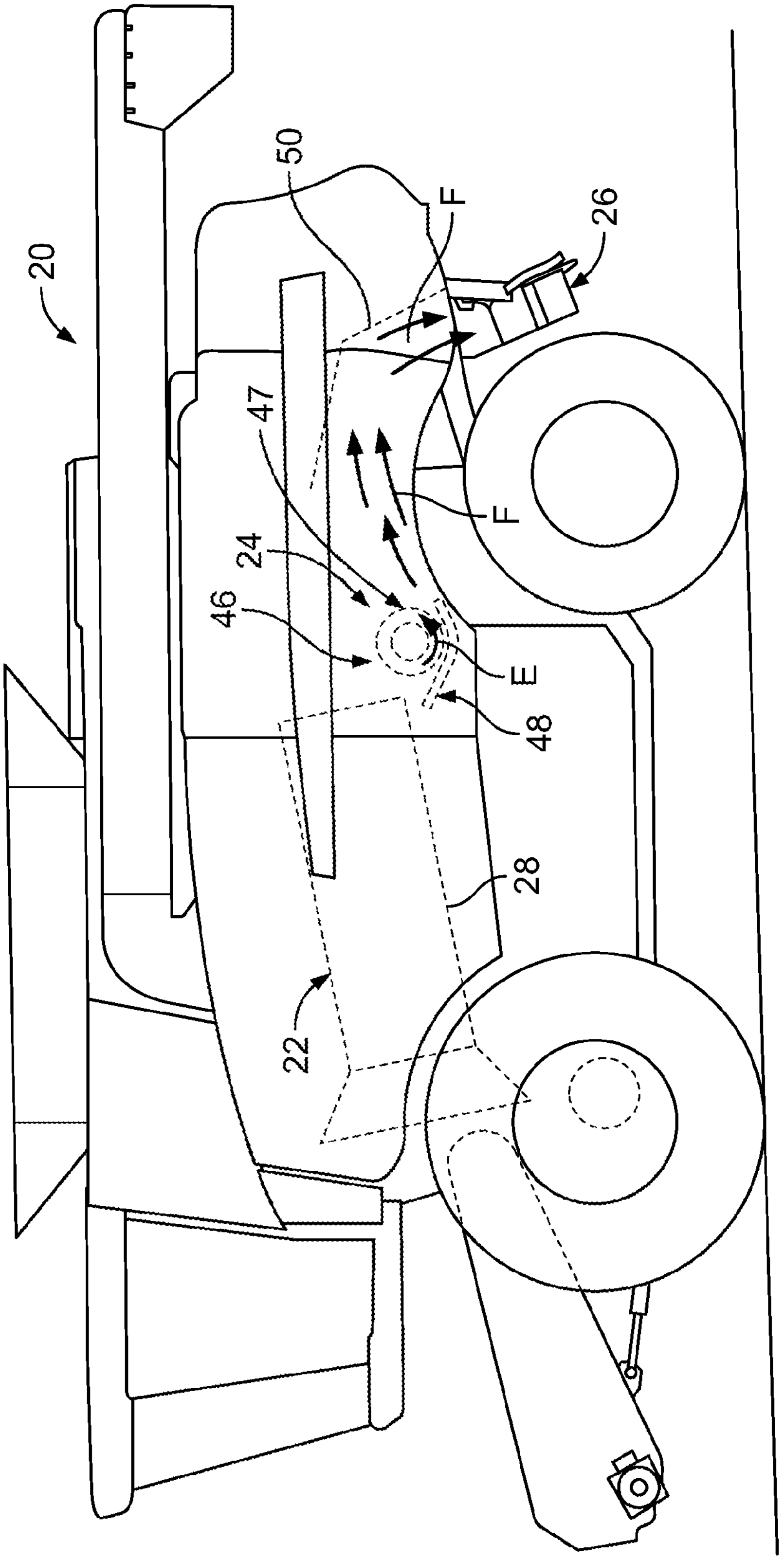
FIG. 1 shows a simplified side view, from the left side, of an agricultural combine.
Figure 2:
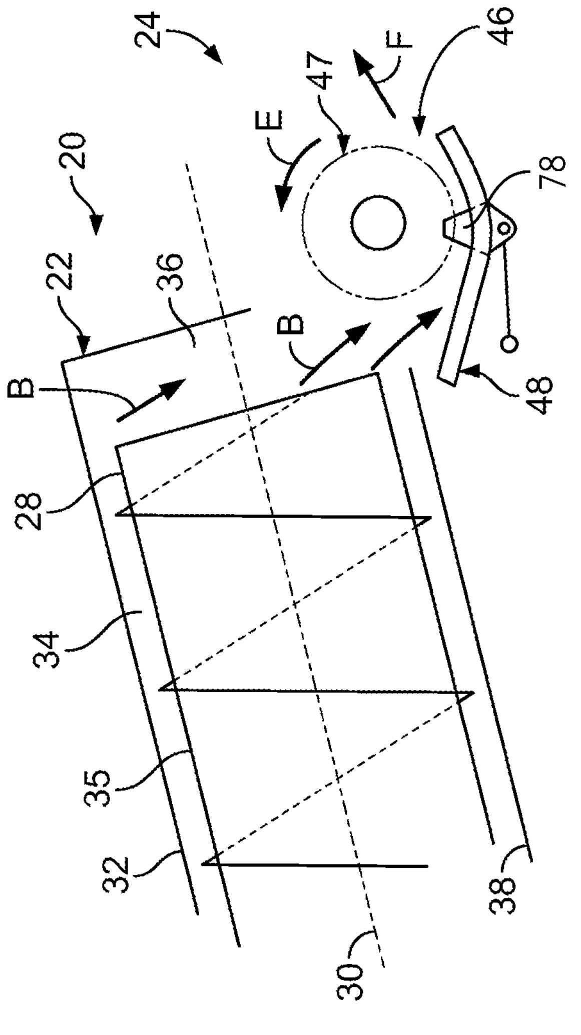
FIG. 2 shows a simplified side view, from the left side, of the threshing system and a portion of the crop residue treatment and distribution system of the combine of FIG. 1.

Referring now to the drawings, and as described in the '949 patent as well as U.S. Pat. Nos. 7,677,965 and 7,484,350, which are each incorporated by reference herein, FIGS. 1 and 2 depict an exemplary agricultural combine 20 that can include a longitudinally axially arranged threshing system 22 and a crop residue treatment and distribution system 24 with a crop residue spreader 26. Threshing system 22 can include a cylindrical threshing rotor 28 within a rotor housing 32. The rotor 28 can be conventionally supported and rotatable in a predetermined direction, e.g., clockwise, about a rotational axis 30. The rotor 28 can convey a flow of crop material in a helical flow path through a space 34 extending circumferentially around an outer cylindrical surface 35 of rotor 28 and an inner circumferential surface 38 of rotor housing 32. As the crop material is moved through space 34, the crop, such as grain, legumes, or the like, can be loosened and separated from crop residue, such as husk and pods, and carried away in a conventional manner.

The crop residue can continue along the helical path through space 34, and is then expelled, as denoted by arrows B, into and through a discharge opening and passage 36, which can be an extension of space 34 at the downstream end of threshing rotor 28.

Crop residue treatment and distribution system 24 can include a transport and chopping assembly, such as chopper assembly 46 configured about an aft portion of the combine 20, sometimes hereinafter referred to as rotary assembly 46, having a rotary chopper element 47 rotatable in a direction E above a concave pan assembly such as chopper grate assembly 48. The chopper assembly 46 is operatively connected downstream of the threshing system 22 to receive the flow of crop material from the threshing system 22. The rotary chopper element 47 can include a cylindrical element or rotary member, that has a number of paddles or knife blades mounted or affixed thereto at a plurality of mounting locations distributed about the periphery, as is shown in the '949 patent. Rotary chopper element 47 can rotate at a rapid speed, so as to be capable of accelerating and propelling a flow of crop residue rearward within the confines of the rear end of combine 20, as generally denoted by arrows F. Such rearward flow can be guided and directed by internal panels or shields, generally denoted by shields 50, to flow through a rear opening so as to be deposited directly onto a field, such as in a windrow, or to flow into a secondary crop residue chopper and/or spreader 26 for spreading in a swath on the field.

Figure 3:
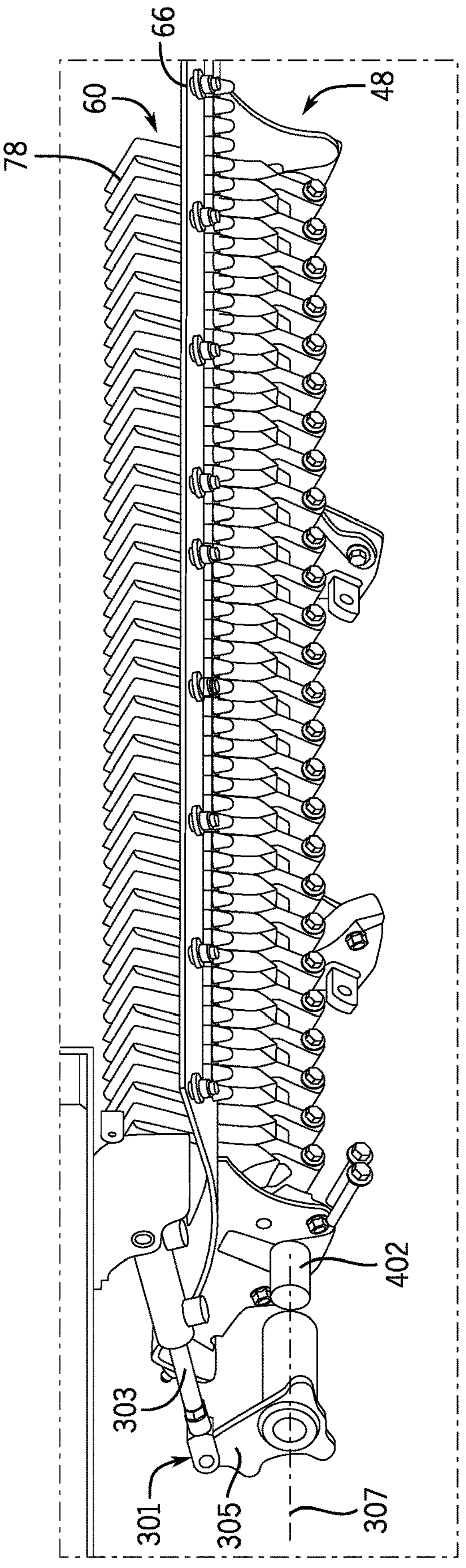
FIG. 3 shows a perspective view, from the left rear side, of a chopper grate assembly, which generally includes a counter knife assembly and a grate.
Figure 4:
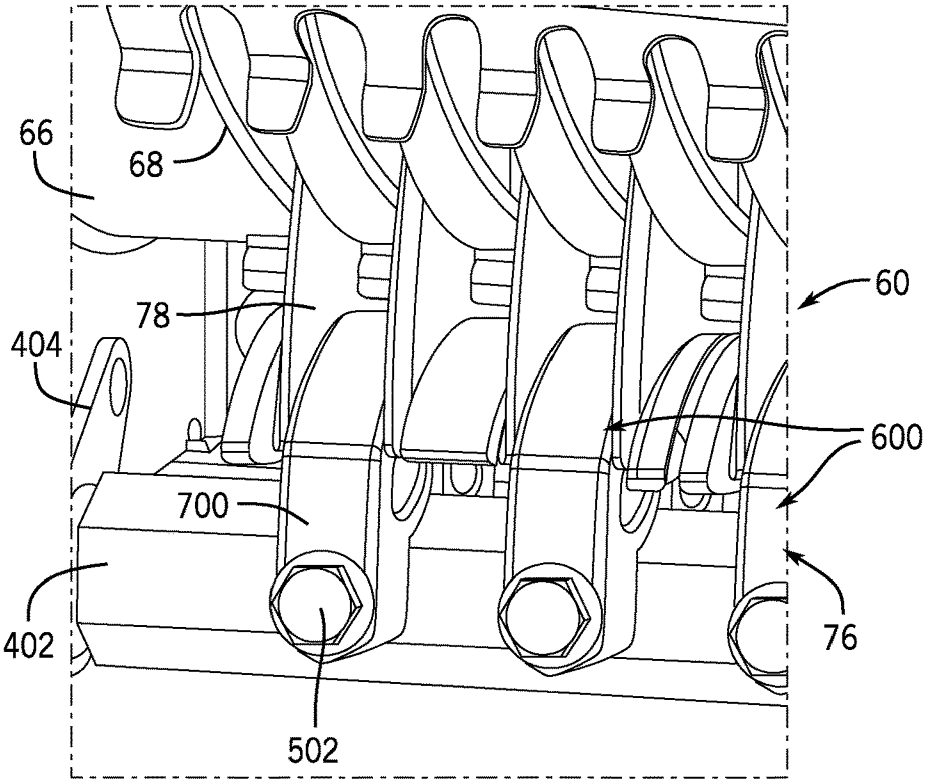
FIG. 4 shows a detailed isometric view of the chopper grate assembly of FIG. 3, wherein various components have been omitted to reveal the interconnection between the knife banks of the counter knife assembly and a common shaft.

FIG. 3 depicts an isometric view of chopper grate assembly 48, wherein the adjustment mechanism 301 of that assembly 48 is shown partially exploded away from the remaining assembly 48. The chopper grate assembly 48 generally includes (i) a grate portion 66 having a plurality of spaced slots 68, and (ii) a counter knife assembly 60 that is movable relative to grate portion 66. Rotary chopper element 47 and grate portion 66 define a passageway therebetween for the crop residue flow that is directed to the integral chopper assembly 46 for treatment thereby, such as crop residue flow B from the threshing system 22 (see FIG. 2). The slots 68 in grate portion 66 are generally elongated and extend along the grate portion 66 generally in the direction of the crop residue flow B.

Turning now to FIGS. 3-5 and 8, the counter knife assembly 60 may include a plurality of counter knife bank assemblies or counter knife banks or knife banks 600 that are each mounted to a common shaft 402. Each knife bank 600 may include a plurality of spaced blades or knife elements 78 positioned generally beneath and parallel to both rotary chopper element 47 and grate portion 66. The perimeter sides of each knife element 78 are sharp (as shown in FIG. 6) for cutting crop material. The knife elements 78 are mounted at positions along counter knife assembly 60 that correspond to slots 68 (FIG. 9) in grate portion 66. The slots 68 in grate portion 66 can be sized and configured to permit the blades or knife elements 78, when moved, to project through slots 68, such as disclosed in WO2014179563, which is incorporated by reference. The knife banks 600 may be mounted to common shaft 402, the common shaft 402 having a hexagonal, or otherwise non-circular cross-section. It is noted that shaft 402 could have a circular cross-sectional shape, if so desired.

The integral chopper assembly 46 can include an adjustment mechanism 301 for adjustably varying the rotational position of the counter knife assembly 60 relative to the grate portion 66 of the chopper grate assembly 48 between a fully deployed position wherein the knife elements 78 extend through the slots 68 of the grate portion 66 of the chopper grate assembly 48 at a maximum projection and a partially or fully retracted position wherein the knife elements 78 project minimally, if at all, through the slots 68, such as shown in U.S. Pat. No. 8,141,805, which is incorporated by reference herein.

Figure 9:
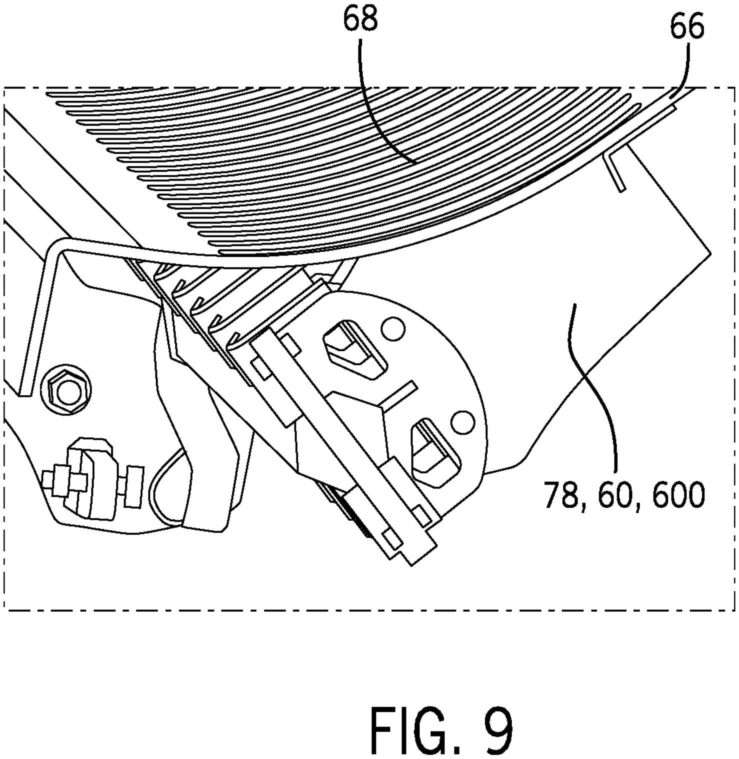
FIG. 9 is a detailed isometric view of the chopper grate assembly showing the interaction between the knives and the chopper grate assembly.

Turning now to FIG. 9, the knife elements 78 may be sized and shaped such that they at least partially fill the slots 68 when the knife elements 78 are moved to the fully retracted position. An end stop in the form of a bolt 902 may be mounted on the grate portion 66 to maintain the knife elements 78 in that fully retracted position. Alternatively, item 902 may represent a potentiometer that tracks the rotational position of knife elements 78 and the potentiometer may communicate (via a controller) with an adjustment mechanism 301 to rotate the knife elements 78 to the fully retracted position where the knife elements at least partially fill the slots 68.

Turning back to FIG. 3, adjustment mechanism 301 may comprise an actuator 303, such as a hydraulic cylinder, pneumatic cylinder, mechanical device or electrical actuator or solenoid, for example. Shaft 402 may be fixedly and non-rotatably connected to either a lever arm 305 (shown exploded from shaft 402) or a tube or shaft extending from lever arm 305 by one or more fasteners. The actuator 303 is also coupled to lever arm 305 such that extension and retraction of actuator 305 causes rotation of lever arm 305 and the entire counter knife assembly 60 about the axis 307 passing through shaft 402. Alternatively, shaft 402 may be manually rotated by either a handle that is connected to shaft or a rock shaft handle that is connected to shaft 402 by an intermediate linkage.

Turning now to FIG. 6, each knife bank 600 includes four knife elements 78*a*-*d* (referred to either individually or collectively as knife element(s) 78), two knife holders 700*a* and 700*b* (referred to either individually or collectively as knife holder(s) 700), a central spacer 602, two end plates 604 and 616, and a fastener 608 for fastening those components together. Fastener 608 comprises a threaded bolt 608*a* and a nut 608*b* that is fixed to the threaded end of bolt 608*a*. The components of each knife bank 600 are sandwiched together in the following order: end plate 606, knife element 78*a*, knife holder 700*a*, knife element 78*b*, spacer 602, knife element 78*c*, knife holder 700*b*, knife element 78*d*, and end plate 604. Threaded bolt 608 is positioned through registered openings in each of the above-described components. It should be understood that the number of knife elements and knife holders may vary and that various components of knife bank, such as the spacer 602, may be omitted without affecting the scope or spirit of the invention.

It is noted that components 602, 604, 700 and 606 each have a radiused top surface of a common size, which has an axis that may be substantially co-axial with the axis 307 of shaft 402 such that rotation of the shaft 402 does not change the clearance of the components relative to the bottom surface of the grate portion 66. In contrast, a different design having an offset pivot point could compress any crop material between the knife bank and the bottom of the grate portion 66, thus preventing the knife banks 600 from reaching the above-described fully deployed position. The design described herein either limits or prevents the aforementioned compression of crop material while also expelling any accumulated material from between the counter knife blades 78 by virtue of the radiused design and coaxial arrangement of the top surfaces.

It is also noted that the counter knife assembly 60 has a symmetrical design such that it may be removed and reinstalled in a second orientation that is 180 degrees opposite the first orientation so that both sides of the sharpened blade may be utilized.

Figure 5:
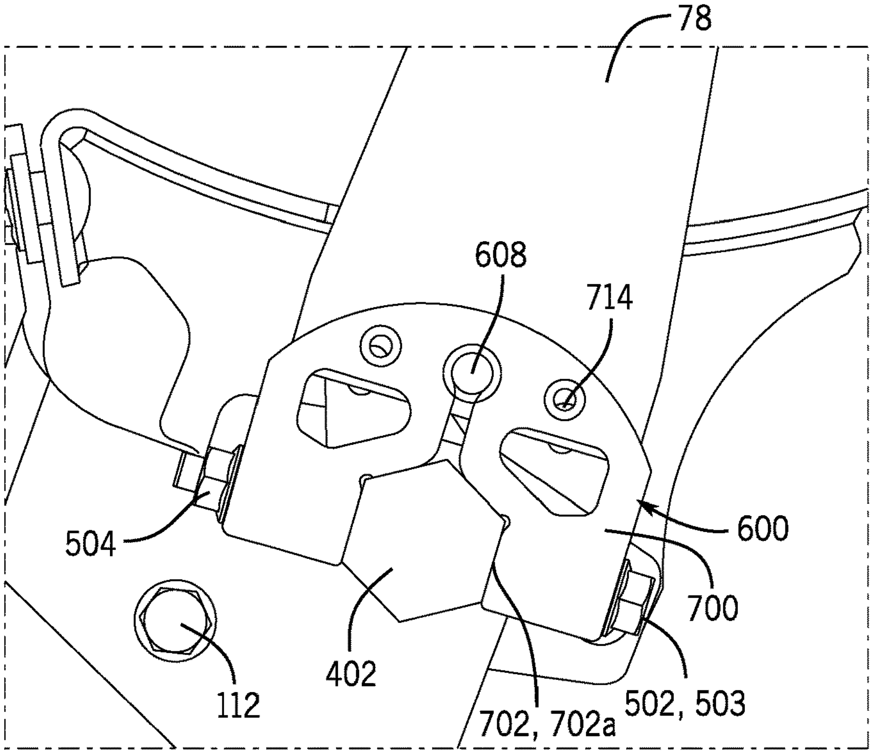
FIG. 5 is a side view of the chopper grate assembly of FIG. 4.
Figure 6:
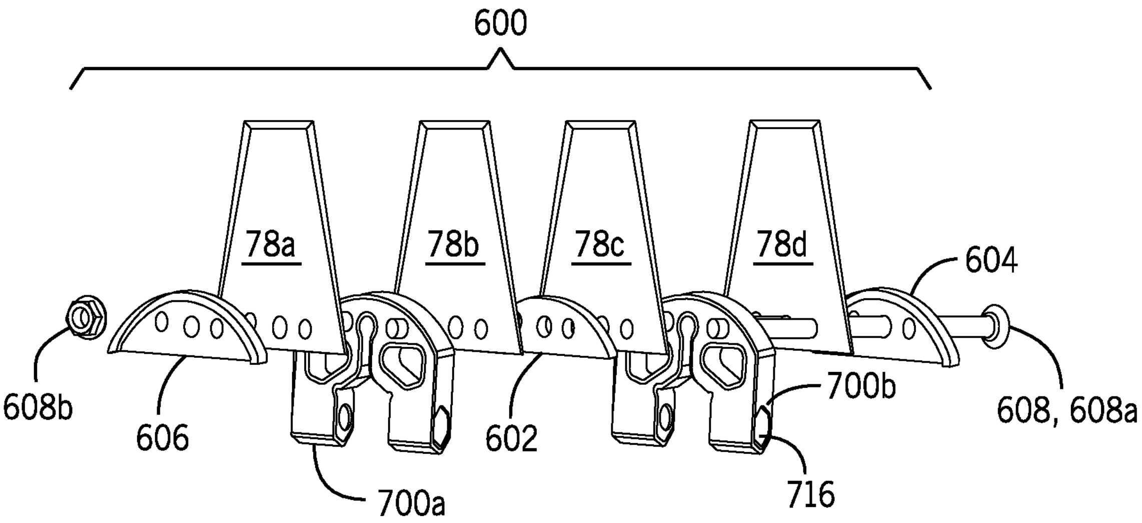
FIG. 6 is an exploded view of one knife bank of the counter knife assembly.
Figure 7:
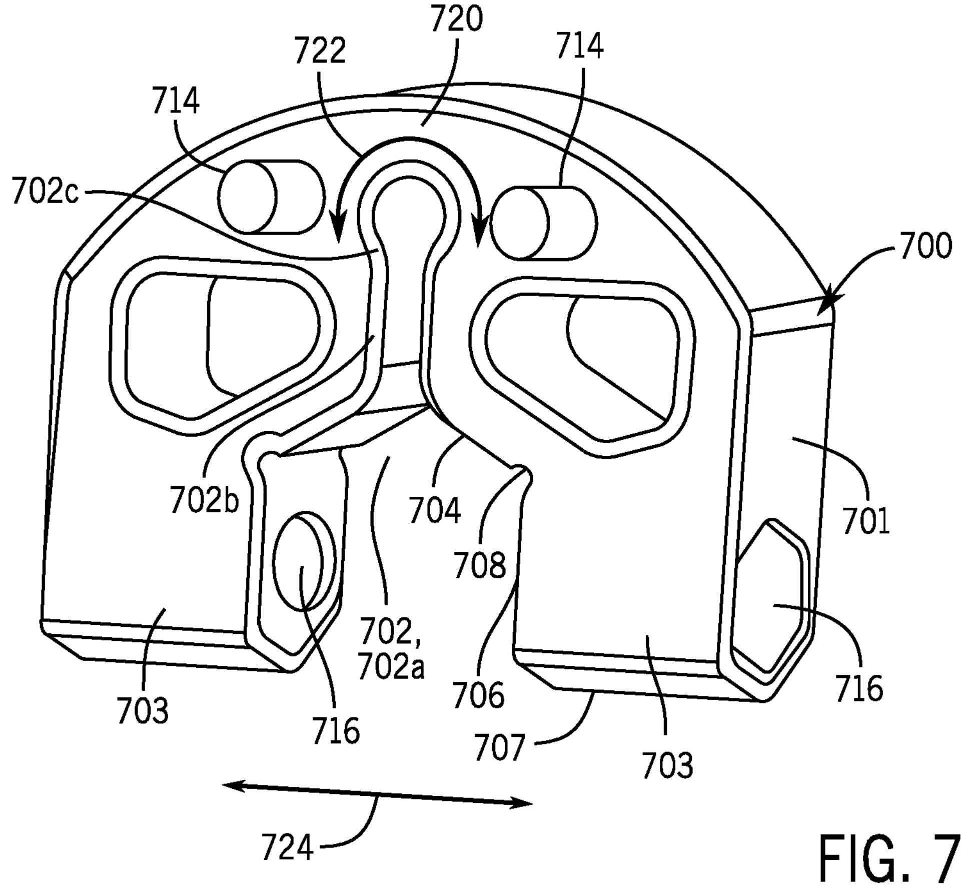
FIG. 7 is an isometric view of one knife holder of the knife bank of FIG. 6.
Figure 8:
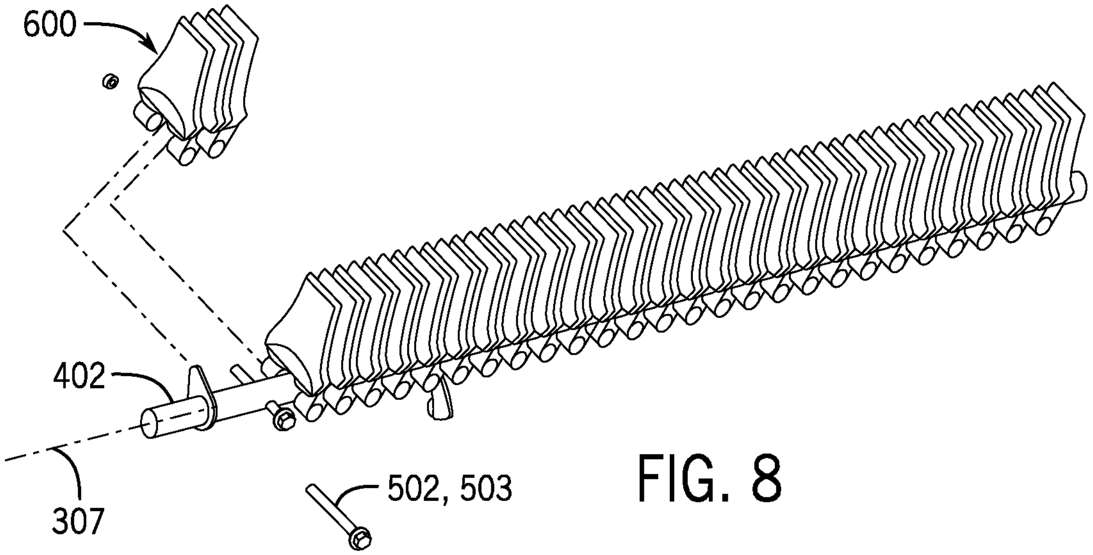
FIG. 8 is an isometric and partially exploded view of the counter knife assembly.

Turning now to FIGS. 5-7, knife holder 700 includes a horseshoe, C-shaped or U-shaped body 701 having two opposing elongated legs 703. Body 701 may also be described as curved. The body 701 may be composed of aluminum, plastic or steel, for example, or any other material that is capable of deformation. Body 701 may be unitary, monolithic and integrally formed, as shown.

A passageway 702 is provided between legs 703. The passageway 702 includes first, second and third portions 702*a*-702*c*, each portion having a unique shape. The portion 702*a* of passageway 702 extends to the open bottom side 707 of body 701 and is sized and shaped to receive and conform to the cross-sectional shape of shaft 402. Specifically, portion 702*a* is sized to accommodate the hex-shaped body of shaft 402 in a form fitting manner (e.g., clearance fit or interference fit), as shown in FIG. 5. Portion 702*a* includes two angled side walls 704 that are separated by an (e.g., obtuse) angle, and vertical side walls 706 that respectively extend from each angled surface 706 to open side 707. A semi-circular relief 708 is disposed at each intersection between surfaces 704 and 706. The second portion 702*b* is a narrow rectangular channel that extends from the first portion 702*a* to a third portion 702*c* in the form of a circular opening 702*c* that is disposed toward the top end of body 701. Third portion 702*c* is sized to accommodate bolt 608*a*.

Two roll pins, pegs or projections 714 are disposed on opposing sides of opening 706. In an assembled form of knife bank 600, each projection 714 is positioned through an opening in one of the knife elements 78 in order to prevent rotation of knife element 78 relative to knife holder 700. It should be noted that the projections and openings could be switched such that the projections may be located on the knife elements 78. Projections 714 are referred to more generally herein as a means 714 for mounting the body 701 to the knife element 78. The means 714 could comprise a clip, clamp, fastener, pin, plug, weld, adhesive, bolt, screw, surface (e.g., dovetail), rail, slide, and so forth.

A transverse opening 716 passes through both legs 703. Stated differently, opening 716 is transverse to opening 702*c*. Opening 716 is also transverse to the longitudinal axis of shaft 402. In an assembled form of counter knife assembly 60, a fastener 502 (FIG. 5) including a threaded bolt 503 is positioned through the opening 716 as well as a thru-opening (not shown) in shaft 402 to prevent rotation of knife holder 700 relative to shaft 402. A nut 504 is secured to the threaded end of the bolt 503 of fastener 502. Fastener 502 may (optionally) be considered as forming part of knife bank 600 or knife holder 700. Fastener 502 may be more generally described as a means 502 for mounting the knife holder 700 to shaft 402, the significance of which will be explained hereinafter. The means 502 may comprise a bolt, screw, fastener, clip, clamp, pin, plug, weld, adhesive, surface (e.g., dovetail), rail, slide, and so forth In the course of assembling knife bank 600 onto shaft 402, the shaft 402 is positioned within the passageway portions 702*a* of the knife holders 700 of each knife bank 600. Fasteners 502 are positioned through channels 716 in body 701 as well as the channels (not shown) formed in shaft 402. The fasteners 502 are then fastened to knife holders 700 and shaft 402.

The fastening action causes deflection of body 701 as indicated by the arrows 722 in FIG. 7, which causes legs 703 to bear on the sides of shaft 402 resulting in a compression-type fit as well as a solid bolt joint. It should be understood that a hinge point 720 is defined on body 701 of knife holder 700 at a location that is at or near opening 702*c*.

Compressing the knife holder 700 onto the shaft 402 prevents inadvertent sideways movement of knife holder 700 in directions 724. The aforementioned sideways movement is normal to the longitudinal axis of the shaft 402. The deformation of body 701 may be either elastic or slightly plastic depending upon the material of body 701 and the degree of deflection. Such deformation permits re-use of knife bank 600. It should be understood that the elongated channel 702*b* is what (at least in part) facilitates or permits the aforementioned deflection about the hinge point 720.

The aforementioned arrangement results in a solid bolt joint, which aids in load transfer through shaft 402 thereby improving durability of the solid bolt joint. The bolt joint will not slip during either side loading or tangential loading of the knife elements 78. The compressible bolt joint permits larger tolerances during manufacturing, which results in improved parts acceptance.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A knife holder for a knife bank of an agricultural vehicle, said knife holder comprising:

a deformable body having opposing legs separated by a passageway, wherein the passageway is shaped and sized for receiving a shaft to which the knife holder is mounted, wherein the body is configured to be elastically deformed;

means disposed on the body for mounting the body to a knife element; and an opening for receiving a fastener for mounting the body to the shaft such that fastening the body to the shaft causes the legs to deflect and compressively contact the shaft and thereby either prevent or limit inadvertent movement of the body relative to the shaft in a direction that is normal to a longitudinal axis of the shaft.

2. The knife holder of claim 1, wherein the passageway extends to an open side of the body.

3. The knife holder of claim 1, wherein the means for mounting the body to a knife element comprises a projection that is positionable within an opening formed in the knife element.

4. The knife holder of claim 1, wherein the body is unitary and monolithic.

5. A knife bank comprising the knife holder of claim 1, the knife bank comprising the knife element mounted to one side of the body by said means for mounting the body to the knife element, as well as another knife element mounted to an opposing side of the body.

6. The knife bank of claim 5, wherein each knife element has multiple sides and sharpened edges on each side.

7. A counterknife assembly comprising the knife bank of claim 5 and said shaft.

8. The counterknife assembly of claim 7, wherein the shaft has a non-circular cross-section and the passageway of the knife holder is sized to non-rotatably receive the non-circular shaft such that the shaft is prevented from rotating relative to the knife holder.

9. The counterknife assembly of claim 8, wherein the shaft is hexagonal.

10. The counterknife assembly of claim 7, wherein the knife bank includes another knife holder that is mounted to said another knife element, wherein each knife holder includes a radiused top surface defined by an axis that is substantially aligned with the longitudinal axis of the shaft.

11. A chopper assembly comprising the counterknife assembly of claim 7 and a rotary chopper element positioned adjacent the counterknife assembly.

12. A combine harvester comprising the chopper assembly of claim 11, wherein the combine harvester comprises a threshing section and the chopper assembly is positioned downstream of the threshing section.

13. A knife holder for a knife bank of an agricultural vehicle, said knife holder comprising:

a deformable body having opposing legs separated by a passageway, wherein the passageway is shaped and sized for receiving a shaft to which the knife holder is mounted;

means disposed on the body for mounting the body to a knife element; and an opening for receiving a fastener for mounting the body to the shaft such that fastening the body to the shaft causes the legs to deflect and compressively contact the shaft and thereby either prevent or limit inadvertent movement of the body relative to the shaft in a direction that is normal to a longitudinal axis of the shaft, wherein the passageway extends to an open side of the body, and wherein the passageway extends to a second opening formed in the body through which a fastener is received for mounting together components of the knife bank.

14. The knife holder of claim 13, wherein the passageway includes a narrowed channel extending between the open side of the body and the second opening.

15. The knife holder of claim 13, wherein the second opening constitutes a hinge point about which the body is configured to deform upon mounting the body to the shaft.

* * * * *